3,446,733
TREATMENT OF OXYGEN-POOR WATER
Francis J. Shell, Bartlesville, Okla., assignor to Phillips Petroleum Company, a corporation of Delaware
No Drawing. Filed Nov. 21, 1966, Ser. No. 595,596
Int. Cl. C02b 1/18, 5/02
U.S. Cl. 210—59                                18 Claims

ABSTRACT OF THE DISCLOSURE

Water is treated to increase its capability for supporting marine life comprising the addition of an agent selected from the group consisting of (1) a sulfoalkylated tannin and (2) a metal complex of a sulfoalkylated tannin wherein said metal is selected from the group consisting of iron, copper, chromium, nickel, cobalt, manganese, zinc, aluminum, titanium, vanadium, and mixtures thereof.

---

This invention relates to the treatment of oxygen-poor water. In one aspect this invention relates to the treatment of water which has a low dissolved oxygen content or is substantially biologically sterile to increase its capability to support marine life.

Pollution of the natural water systems, i.e., rivers, lakes, streams, etc., of the United States has become a major problem associated with the increased population and industrialization of this country. One of the major deleterious effects of this pollution, primarily caused by the disposal of industrial wastes and sewage, is a low content of dissolved oxygen in the water. In several locations the content of dissolved oxygen has reached a level so low that the water has become virtually incapable of supporting marine life, or at least many forms of marine life cannot survive for any prolonged period in these contaminated waters. For example, it has been determined that there is a 300 square mile oval in the center of Lake Erie which is virtually devoid of oxygen and contains little or no marine life. Among the various factors causing the low content of dissolved oxygen are effluents from industrial waste disposals and municipal sewage systems containing chemicals which promote growth of oxygen-absorbing algae and other oxygen-demanding substances which are dumped into these waters.

Some of the common treatments for municipal water supplies for human consumption also tend to affect the capability of the water to support marine life. These treatments, such as chlorination and fluorination, are designed to sterilize the water against microorganisms but a secondary effect is to reduce the capability of the water to support marine life. Because of the quantity of purifying agents which must be added to the municipal water supplies for some systems, tap water cannot be used for aquariums without aeration or other treatment to increase the dissolved oxygen content therein. As cities are required to reuse water because of ever-increasing demands on limited water supplies, larger quantities of purifying agents will be required thereby compounding the incapability of municipal water to support marine life. Also, as this municipal water is cycled back to the natural water systems after use, the capability of these waters to support marine life is decreased.

Many techniques have been proposed for eliminating the existing pollution problem, restoring the content of dissolved oxygen in the natural water systems and removing contaminants from waste waters prior to disposal into the natural water systems. One chemical process used to remove contaminants from polluted waters and waste waters is oxidation. Oxidation also increases the capability of water which is substantially biologically sterile to support marine life. For most purposes, oxidation processes proceeding at rates commonly found in natural water systems are not adequate to handle large amounts of contaminants, therefore, artificially based techniques must be used. For example, in the simplest man-helped processes, air is either pumped into waste waters to oxidize contaminants, or the waste waters are sprayed into the air. These oxidation methods, although effective for removing reduced chemical compounds or for stripping volatile compounds, are very expensive and impractical for eliminating existing pollution in the natural water systems.

I have found that water which is substantially biologically sterile or has a low content of dissolved oxygen can be treated effectively to increase its ability to support marine life by the addition of a class of additives comprising a sulfoalkylated tannin or a metal complex of a sulfoalkylated tannin and the water-soluble cationic and anionic compounds of certain amphoteric metals. These additives are readily available and are relatively inexpensive.

Accordingly, an object of this invention is to provide an inexpensive and efficient method for treating polluted, oxygen-poor water to increase its capability for supporting marine life.

Another object of this invention is to provide an inexpensive and efficient method for treating water which has been purified by chemical agents for human consumption to increase its capability to support marine life.

Still another object of this invention is to provide a method for treating waste water prior to disposal into natural water systems containing marine life.

Other aspects, objects, and advantages of this invention will be apparent to those skilled in the art from the following detailed description and appended claims.

According to this invention, a first agent selected from the group consisting of (1) a sulfoalkylated tannin and (2) a metal complex of a sulfoalkylated tannin wherein said metal is selected from the group consisting of iron, copper, chromium, nickel, cobalt, manganese, zinc, aluminum, titanium, vanadium, and mixtures thereof and a second agent selected from the group consisting of the water-soluble cationic and anionic compounds of chromium, aluminum, vanadium, titanium, zinc, manganese, and mixtures thereof with a weight ratio of the first agent to the second agent being within the range from 20:1 to 1:1 are added to the water to be treated. The total amount of the first agent and the second agent added to the water to be treated is at least 4.3 parts per million by weight. Also, according to this invention, said first agent alone may be added to the water being treated instead of mixtures of the first and second agents.

The first additive agent of the combination additive can be either a sulfoalkylated tannin or one or more certain metal complexes of a sulfoalkylated tannin. The sulfoalkylated tannins, e.g., sulfomethylated quebracho, are presently preferred for use as said first additive agent. The second additive agent of the combination additive of the invention is selected from the group consisting of the water-soluble cationic and anionic compounds of chromium, aluminum, vanadium, titanium, zinc, manganese, and mixtures thereof. The ammonia, sodium and potassium chromates and dichromates are presently preferred for use as the second additive agents.

The metal complexes of sulfoalkylated tannins which can also be used as first agent in the additives of the invention are preferably those which are soluble in the water. Examples of metal compounds which can be used as the complexing metal reagent in the preparation of said metal complexes include the water-soluble salts, such as the nitrate or chloride, and the hydroxides or hydrated oxides of iron, copper, chromium, nickel, cobalt, manganese, zinc, aluminum, titanium, and vanadium. Generally speaking, the water-soluble salts are preferred. However, the hydrated oxides or hydroxides of said metals are sometimes preferred compounds because they contain anions such as chloride or nitrate which would be left in the water when the cation is complexed with the tannin. Another preferred class of metal-containing compounds which can be used are the ammonium and alkali metals of the above metals wherein the said above metals are present in the anion portion of the molecule, e.g., the alkali metal chromates, vanadates, titanates, manganates, etc., and the alkali metal dichromates. As used herein and in the claims, unless otherwise specified, the term alkali metal is employed generically to include sodium, potassium, lithium, rubidium, cesium, and ammonium.

Tannins which can be used in preparing the sulfoalkylated tannins and the metal complexes of sulfoalkylated tannins used in the practice of the invention are the vegetable tannins, including both the gallotannins and the flavotannins (sometimes called the catechol tannins). The word "tannin" as used herein and in the claims, unless otherwise specified, refers to and includes the vegetable gallotannins and the vegetable flavotannins. Examples of the gallotannins include: tannic acid or Chinese tannin; Turkish tannin; hamamelis tannin; acer-tannin; glucogallin; sumac tannin; valonia oak gall tannin; tea tannin; tara; myrabolam; divi-divi; algarobillo; oak; and chestnut. Examples of flavotannins include: gambier and catechu or Burma cutch; quebracho; tizerah; urunday; wattle; mangrove; spruce; hemlock; larch; willow; and avaram. Said flavotannins are the presently preferred tannins for use in accordance with the invention.

Presently, quebracho is the most preferred tannin. Quebracho is extracted from the bark and wood of the quebracho tree with water. The conventional method of preparing quebracho is to disintegrate the wood and bark, extract the bark and/or wood with water, the solution of quebracho and water is evaporated to 85 percent concentration of quebracho and the concentrated quebracho is spray dried. Quebracho is the commercial catechol tannin or flavotannin product. The high tannin content (about 20 percent) of the wood of the quebracho tree makes it the important source of catechol tannins. The principal source of gallotannins is gall nuts.

As indicated above, the sulfoalkylated tannins, e.g., sulfomethylated quebracho, are presently preferred for use as the first agent in the combination additives of the invention. As will be understood by those skilled in the art in view of this disclosure, the following description of methods (including reaction conditions) for preparing metal complexes of sulfoalkylated tannins also applies to the preparation of the sulfoalkylated tannins. The only difference is that no complexing metal reagent is used.

The metal complexes of sulfoalkylated tannin, either a gallotannin or a flavotannin, can be prepared by several different procedures. All of said procedures involve the inter-reaction, in an alkaline aqueous reaction medium under reaction conditions, between a tannin compound, a carbonyl compound selected from the group consisting of aldehydes and ketones, a sulfur compound selected from the group consisting of sulfurous acid and water-soluble salts thereof, and a metal compound selected from the group consisting of the hydrated oxides or hydroxides and the water-soluble salts of iron, copper, chromium, nickel, cobalt, manganese, zinc, aluminum, titanium, and vanadium. In one method an alkali metal hydroxide, e.g., sodium hydroxide; an aldehyde of ketone, e.g., formaldehyde or acetone; a sulfite, e.g., sodium sulfite or sodium bisulfite; a tannin, e.g., quebracho (quebracho extract); and a suitable metal compound, e.g., a ferric salt; are added to water in a reaction vessel to form a reaction mixture. The sequence of adding said reactants to the water is not critical; however, it is sometimes preferred to add the alkali metal hydroxide first. The quantity of alkali metal hydroxide employed will be sufficient to make the reaction mixture alkaline, at least initially. The reaction mixture is then maintained under conditions of time and temperature sufficient to cause the substantial conversion of the tannin compound into a metal complex of sulfoalkylated tannin.

If desired, the carbonyl compound, e.g., formaldehyde or acetone, and the sulfite can be prereacted. For example, in one method a solution contaning formaldehyde and sodium sulfite is prepared separately and then combined with the other reactants in the alkaline reaction medium.

In one preferred method for preparing the metal complexes, an alkaline solution is prepared by dissolving a tannin (such as quebracho extract and an alkali metal hydroxide (such as sodium hydroxide) in water. A second solution is formed by admixing a carbonyl compound (such as formaldehyde) and a sulfite (such as sodium bisulfite) in water. This second solution is then added to the alkaline solution. The resulting solution is then maintained at an elevated temperature for a period of time sufficient for at least a substantial portion of the aldehyde and the sulfite to react with the tannin to form a sulfoalkylated tannin. A metal compound (such as ferric sulfate) is then added to the resulting solution and reacted with the sulfoalkylated tannin therein to form a metal complex of sulfoalkylated tannin which is recovered from the resulting reaction mixture. In this instance, using the exemplary reactants mentioned above, the product is an iron complex of sulfomethylated quebracho.

In another preferred method for preparing the metal complexes of the invention, the desired amount of water is added to a reactor vessel equipped with suitable stirring means. The desired amount of carbonyl compound (such as formaldehyde) is added to the water with stirring. The desired amount of a sulfite (such as sodium bisulfite) is then added to the water with stirring and the carbonyl compound and sulfite are permitted to react to completion. Usually the reaction time will be within the range of 0.5 to 3 hours and the final temperature will be in the order of 125° F. depending upon the initial ambient temperature of the water, the amount of reagents, etc. The desired amount of an alkali metal hydroxide (such as sodium hydroxide) is then added. The tannin compound (such as quebracho) is then added to the tank containing the above reagents with vigorous stirring. Heating is initiated and the solution is maintained at an elevated temperature, preferably within the range of 180 to 200° F., for a period of from 1 to 6 hours. The desired amount of a metal compound is then added to the solution of sulfoalkylated tannin and reacted therewith to form a metal complex of sulfoalkylated tannin. It is not necessary to add additional heat to the reactant solution during the addition of the metal compound. The residual heat remaining from dissolving the tannin compound will usually be sufficient.

In the above methods, after the sulfoalkylation reaction is complete, the metal complexes of sulfoalkylated tannin can be recovered from the reaction mixture by any suitable method such as evaporation, drum drying, syray drying, etc.

Due to the complex nature and chemistry of the tannin compounds it is not intended to limit the invention to any specific reaction mechanism, or to any specific method for preparing the sulfoalkylated tannins or metal complexes thereof which are used as the first agent in the additives of the invention. However, the sulfoalkylated tannins and metal complexes thereof can be conveniently described in terms of processes for their manufacture. One reaction mechanism by which said metal complexes of sulfoalkylated tannin can be formed is as follows: Two reactions are involved: (1) a metal complexing reaction whereby an atom of the metal involved complexes with one, two, or three tannin molecules and (2) a sulfoalkylation reaction whereby the tannin molecule is alkylated by one or more sulfoalkylation radicals attached to said tannin molecule as side chains. The alkylene portion of said sulfoalkylene radical is a methylene or substituted methylene group. The side chain or side chains can be represented by the formula —C(R)$_2$—SO$_3$M wherein each R is selected from the group consisting of a hydrogen atom and alkyl, cycloalkyl, aryl, and alkaryl radicals; and M is ammonium or an alkali metal depending upon the particular sulfite employed. As indicated hereinafter, it is preferred when R is other than hydrogen, that said R be an alkyl group containing from 1 to 5 carbon atoms.

As indicated above, the reactions involved in the preparation of the sulfoalkylated tannins and metal complexes of sulfoalkylated tannin used in the practice of the invention are carried out in an alkaline aqueous medium. Hydroxides of the alkali metals sodium, potassium, lithium, rubidium, and cesium can be used to make the alkaline medium. The amounts of the hydroxides used can be varied over a wide range. The principal function of the hydroxide is to impart sufficient initial solubility to the raw tannin so that it can react with the sulfite and aldehyde or ketone reactants and the metal compound in the sulfoalkylation and metal complexing reactions. In order to obtain practical reaction rates for reactions, the pH of the reaction medium should be about 10. Large excesses of the hydroxide above the amount required to initially solubilize the raw tannin should be avoided for best results. After the tannin has been sulfoalkylated it is not necessary that the reaction medium be alkaline.

Carbonyl compounds which can be used in preparing said sulfoalkylated tannins and metal complexes thereof include any aldehyde or ketone containing a >C=O group, the carbon atom of which is capable of becoming a methylene or substituted methylene group. Thus, aldehydes and ketones which can be used can be represented by the formula (R)$_2$C=O wherein R is as defined above. Since said R is non-functional in the reaction, there is no real limit on what it is or the number of carbon atoms which it contains. However, when R is unduly large, solubility problems in the aqueous reaction medium and also in connection with the solubility of the reaction product are encountered. The larger R groups tend to make the product hydrophobic. In general, this is undesirable when the products are used in the additives of the invention. Since it is preferred to carry out the reaction in an aqueous medium, when R is not hydrogen, an alkyl group containing from 1 to 5 carbon atoms is preferred; specifically 1 to 3 carbon atoms are more preferred.

Examples of the preferred aldehydes and ketones include:

Formaldehyde.
Acetaldehyde.
Propionaldehyde.
n-Butyraldehyde.
Isobutyraldehyde.
n-Valeraldehyde.
Acetone.
Methyl ethyl ketone.
Diethyl ketone.
Methyl n-propyl ketone.
Methyl isopropyl ketone.

The sulfur compound used in preparing said sulfoalkylated tannins and metal complexes thereof is, in general, sulfurous acid and its water-soluble salts, such as the alkali metal salts, including the ammonium salts. The alkali metal (as defined above) sulfites are preferred. It is pointed out that when a bisulfite or sulfurous acid is added to the alkaline reaction medium, it will be converted to a sulfite. The term "sulfite" as used herein and in the claims, unless otherwise specified, includes sulfurous acid and bisulfites which, when added to the alkaline reaction medium, will be converted to and react as sulfites.

The amounts of the above-described reactants which are used are not critical. With a significant amount of each of the reactants present, the desired reactions will proceed to some extent and some yield of sulfoalkylated tannin or metal complex of sulfoalkylated tannin (depending upon whether a complexing metal is used) will be obtained. The amounts of each reactant used will depend upon the amount, the kind of tannin, and the percentage of conversion of said tannin which is desired. For results approaching the optimum, it is preferred to use amounts of the reactants which are within the range of from 0.5 to 1.5 times the stoichiometric equivalent amount of each reactant required to completely react the tannin. Amounts of the reactants less than stoichiometric result in less than 100 percent conversion. Amounts in excess of stoichiometric result in a waste of material. Thus, it is preferred to use substantially stoichiometric equivalent amounts of said reactants.

From the above it is seen that specific numerical ranges for the amounts of said reactants will be of only limited value in teaching this invention and it is to be understood the invention is not limited to any such specific numerical ranges. Those skilled in the art can readily determine from a few pilot experiments the stoichiometric amounts of reactants required for the particular tannin being reacted. However, as an aid to those less skilled in the art, the following ranges are set forth.

TABLE I.—AMOUNTS OF REAGENTS PER 100 LBS. OF TANNIN

| Reagent | Broad range, lbs. | Preferred range, lbs. | Preferred range for Quebracho lbs |
|---|---|---|---|
| Alkali metal hydroxide | 5–60 | 10–20 | 12–18 |
| Sulfite | 4–115 | 20–70 | 35–65 |
| Aldehyde or ketone | 1–60 | 5–50 | 15–36 |
| Complexing metal:[1] | | | |
| Fe | 1–56 | 10–26 | 6–20 |
| Cu | 1.5–64 | 18–46 | 6.5–21 |
| Zn | 1.5–65 | 18–46 | 6.7–22 |
| Cr | 1.8–52 | 9–28 | 6.8–17 |
| Ni | 1–59 | 9–28 | 6.5–20 |
| Co | 1–58 | 9–28 | 6.5–19 |
| Mn | 1–55 | 9–28 | 6–18 |
| Ti | 0.8–48 | 7–30 | 5.3–16 |
| V | 0.9–51 | 7–30 | 5.8–17 |
| Al | 0.3–27 | 4–12 | 3–9 |
| All above metals | 0.3–64 | 4–46 | 3–22 |

[1] Calculated as the metal.

The above preferred amounts of reactants can be stated in other ways. For example, in working with the amounts shown in the above Table I, the preferred amount of complexing metal (calculated as the metal) to be added to the sulfoalkylated tannin is in the range of from 1/20 to 3, preferably 1/20 to 1, more preferably 1/8 to 5/8, mols of metal per monomer mol of active ingredient in the particular tannin compound being used. In other words, it is preferred that no excess metal be present in the reaction mixture at the conclusion of the metal complexing reaction. For example, when quebracho extract is the tannin being used, quebracho catechin is considered to be the active ingredient of the quebracho. Based on a molecular weight of 274 for said quebracho catechin, 100 pounds of quebracho extract will contain an average of 0.33 pound mol of quebracho catechin, and the preferred range of reagents given in column 3 of the above Table I has been established on this basis. When other tannin materials are used, the molecular weight of the active ingredient thereof, as well as the amount contained per 100 pounds of tannin, may be different. Thus, it is desirable that the quantities of reagents to be used be established for each particular tannin material used. Those skilled in the art will have no difficulty establishing the amounts of reagents to use in view of this disclosure. Any large deviation from the 0.33 mol of active ingredient in any individual lot of quebracho extract would also require an adjustment of the chemicals used for reacting with said quebracho. However, analysis of six commercially available quebracho extracts available from different sources has shown that commercial quebracho is surprisingly uniform in composition.

The amount of carbonyl compound, e.g., formaldehyde, and the amount of sulfite compound, e.g., sodium bisulfite, used in the reaction will determine the amount of sulfoalkylation of the tannin compound which occurs. This affords another way of expressing the amount of carbonyl compound and sulfite. The amount of sulfoalkylation which occurs in any given reaction situation can be expressed in terms of the parts by weight of the carbonyl compound-sulfite addition product or sulfoalkylation reagent, e.g., $NaSO_3CH_2OH$—formed by reacting stoichiometric amounts of formaldehyde and sodium bisulfite, used per 200 parts by weight of tannin. For example, expressed in this manner and when using formaldehyde, sodium bisulfite, and quebracho, the most preferred amounts of sodium formaldehyde bisulfite addition product will be within the range of from 50 to 175 parts by weight of the sulfomethylation reagent per 200 parts by weight of quebracho.

In general, the reaction conditions are not critical. All the reactions involved in preparing said sulfoalkylated tannins and metal complexes thereof will take place at ordinary room temperatures (70–80° F.) but at a reduced rate and all reaction conditions at which the reactions will take place are within the scope of the invention. However, as a practical matter, it is preferred to employ elevated temperatures to cause said reactions to take place in less time. Any suitable temperature below the decomposition temperature of the tannin can be employed. For example, the application of heat aids in dissolving quebracho in the alkaline medium. Generally, temperatures in the order of 125 to 212° F. are sufficient. However, usually a more preferred range is from 180 to 212° F. If desired, the reaction mixture can be refluxed at atmospheric pressure, or can be heated in an autoclave under super-atmospheric pressure to obtain higher temperatures. Generally, the maximum temperatures employed will be in the order of 300° F. Thus, an over-all numerical range for the reaction temperatures can be said to be from 70 to 300° F.

The reaction time will be dependent upon the reaction temperature employed. Reaction times in the order of 0.5 to 10 hours have been found quite sufficient. Preferably, the reaction times will be within the range of 1 to 6, more preferably 1 to hours.

Metal compounds which can be used as the second additive agent in the combination additive of the invention are the water-soluble cationic and anionic compounds of the amphoteric metals, chromium, aluminum, vanadium, titanium, zinc, and manganese. As used herein and in the claims, unless otherwise specified, a cationic compound of a metal is defined as a compound wherein one of said amphoteric metals is present in the cationic portion of the molecule and an anionic compound of a metal is defined as a compound wherein one of the amphoteric metals is present in the anionic portion of the molecule. Examples of said compounds include, among others, the simple salts such as the nitrates, chlorides, iodides, bromides, sulfates, etc., of said metals. Also included are the double salts such as potassium tetrachlorozincate-aluminum sulfate, sodium chromium II sulfate hexahydrate, potassium manganese II chloride hexahydrate, sodium manganese II chloride, sodium vanadium sulfate hexahydrate, zinc ammonium chloride, zinc sodium chloride, and sodium zinc sulfate hexahydrate; alums such as potassium aluminum sulfate dodecahydate; potassium chromium sulfate dodecahydrate, and cesium titanium sulfate dodecahydrate; anionic compounds such as the alkali metal chromates or dichromates, the ammonium chromates or dichromates, alkali metal aluminates, potassium titanate, sodium titanate, sodium vanadate, ammonium metavanadate, zinc dichromate, sodium zincate; and others.

In the combination additive of the invention the weight ratio of the first additive agent to the second additive agent is generally within the range of from 20:1 to 1:1, preferably within the range of from 12:1 to 2:1.

The amount of the additives used for treating water in accordance with this invention will vary dependent on the condition of the water being treated.

The amount of said additive required to increase the capability of polluted or sterilized water is at least 0.0015 pound per barrel of the water, which is equivalent to 11.6 pounds per acre-foot or 4.3 parts per million by weight. However, it is within the scope of this invention to employ amounts of the additives in greater quantities than this amount. The amount of additives used will always be an amount sufficient to increase the content of dissolved oxygen in the water to a level capable of supporting marine life. As used herein the word "barrel" refers to a barrel of 42 standard U.S. gallons. The following examples will serve to illustrate the invention. In the following examples the additives were added to vessels containing tap water from a municipal water system having a typical analysis of:

| | |
|---|---|
| pH | 8.5 to 9.2 |
| Dissolved solids _____ p.p.m__ | 200 to 250 |
| Hardness as $CaCO_3$ _____ p.p.m__ | 125 to 150 |
| Sulfates _____ p.p.m__ | 20 to 50 |
| Chlorides _____ p.p.m__ | 30 to 60 |
| Fluorides, maximum of 1 p.p.m. | |

In these examples sulfomethylated quebracho is referred to as "SMQ" for convenience.

EXAMPLE I

Nine minnows were placed in each of three vessels containing five gallons of city tap water with the typical analysis above. The water in the first vessel was not treated with any additives, 0.01 pound per barrel (equivalent to 28.5 parts per million by weight) of SMQ was added to the water in the second vessel and 0.01 pound per barrel (equivalent to 28.5 parts per million by weight) of a mixture of seven parts by weight of SMQ to one part $Na_2Cr_2O_7.2H_2O$ was added to the water in the third vessel. All three vessels were aerated with equal amounts of oxygen. At the end of four days, seven minnows in the untreated tap water had died, two minnows in the water treated with SMQ had died and none of the minnows in the water treated with the mixure of SMQ and $Na_2CR_2O_7.2H_2O$ 

had died. On the sixth day the concentration of SMQ in the second vessel was increased to 0.02 pound per barrel (equivalent to 57 parts per million by weight) and the concentration of the mixture of SMQ and $Na_2Cr_2O_7.2H_2O$ in the third vessel was increased to 0.02 pound per barrel (equivalent to 57 parts per million by weight). On the seventh day the remaining two minnows in the untreated water died, a third minnow in the water treated with SMQ died and none of the minnows in the water treated with the mixture of SMQ and $Na_2Cr_2O_7.2H_2O$ had died. A fourth minnow died in the water treated with SMQ on the eighth day and two minnows in the water treated with the mixture of SMQ and $Na_2Cr_2O_7.2H_2O$ died on the tenth day, the first to die in the water treated with this latter additive. On the thirteenth day the concentration of SMQ and the mixture of SMQ and $Na_2Cr_2O_7.2H_2O$ was increased to 0.04 pound per barrel (equivalent to 114 parts per million by weight) in the second and third vessels, respectively. After sixteen days no additional minnows had died in either treated water.

EXAMPLE II

A second test series with the same setup as that in Example I was preformed to determine if smaller concentrations of the additives would give the same type results. A concentration of 0.004 pound per barrel (equivalent to 11.4 parts per million by weight) of SMQ and a mixture of SMQ and $Na_2Cr_2O_7.2H_2O$, with a weight ratio of 7:1, was added to vessels two and three, respectively. After several days, four minnows in the untreated water had died, two minnows treated with SMQ had died and one minnow in the water treated with the mixture of SMQ and Na$_2$Cr$_2$O$_7$.2H$_2$O had died thereby corroborating the previous trend of fewer deaths in the water treated with the additives in this invention.

The results from these two test series show that the treatment of city tap water, which has been chemically treated for human consumption, with SMQ and a combination additive of SMQ and Na$_2$Cr$_2$O$_7$.2H$_2$O, one of the preferred additives of this invention, increases the capability of the water to support marine life.

While certain embodiments of this invention have been described for illustrative purposes it is not limited thereto. Various modifications and alterations will be apparent to those skilled in the art without departing from the scope and spirit of the invention.

I claim:

1. A method for treating water containing marine life to increase its capability for supporting said marine life comprising adding to said water an agent selected from the group consisting of (1) a sulfoalkylated tannin and (2) a metal complex of a sulfoalkylated tannin wherein said metal is selected from the group consisting of iron, copper, chromium, nickel, cobalt, manganese, zinc, aluminum, titanium, vanadium, and mixtures thereof.

2. The method for treating water according to claim 1 wherein the amount of said additive agent added is at least 4.3 parts per million by weight of water being treated.

3. The method for treating water according to claim 2 wherein said additive agent comprises sulfomethylated quebracho prepared by contacting quebracho extract with, in parts by weight per 100 parts by weight of said quebracho extract, from 15 to 36 parts of formaldehyde and from 35 to 65 parts of sodium bisulfite.

4. The method of treating water according to claim 2 wherein said additive agent comprises metal complexes of a sulfomethylated quebracho; said metal being selected from the group consisting of iron, copper, chromium, nickel, cobalt, manganese, zinc, aluminum, titanium, vanadium, and mixtures thereof; said metal complex having been prepared by contacting quebracho extract, in an alkaline aqueous reaction medium at a temperature within the range from 70 to 300° F. and in amounts based on 100 parts by weight of quebracho with from 1 to 60 parts by weight of a carbonyl compound selected from the group consisting of the lower molecular weight aldehydes and ketones, from 4 to 115 parts by weight of a sulfur compound selected from the group consisting of sulfurous acid and water-soluble salts thereof, and from 0.3 to 64 parts by weight of a complexing metal present in a compound selected from the group consisting of the hydroxides and the water-soluble salts of iron, copper, chromium, nickel, cobalt, manganese, zinc, aluminum, titanium, vanadium, and mixtures thereof.

5. The method of claim 1 further comprising the addition of a second agent selected from the group consisting of the water-soluble cationic and anionic compounds of chromium, aluminum, vanadium, titanium, zinc, manganese, and mixtures thereof, with the weight ratio of said first agent to said second agent being within the range from 20:1 to 1:1.

6. The method for treating water according to claim 5 wherein the first agent comprises a sulfomethylated quebracho prepared by contacting quebracho extract with, in parts by weight per 100 parts by weight of said quebracho extract, from 15 to 36 parts of formaldehyde and from 35 to 65 parts of sodium bisulfite; said second agent is selected from the group consisting of ammonium chromate, ammonium dichromate, sodium chromate, sodium dichromate, potassium chromate, potassium dichromate, and mixtures thereof; and the total amount of said first agent and said second agent added is at least 4.3 parts per million by weight of water being treated.

7. The method of treating water according to claim 5 wherein said first agent comprises a metal complex of a sulfomethylated quebracho; said metal being selected from the group consisting of iron, copper, chromium, nickel, cobalt, manganese, zinc, ammonium, titanium, vanadium, and mixtures thereof; said metal complex having been prepared by contacting sulfomethylated quebracho in an alkaline aqueous reaction medium at a temperature within the range of from 70 to 300° F. and in amounts based on 100 parts by weight of said sulfomethylated quebracho with from 1 to 60 parts by weight of a carbonyl compound selected from the group consisting of the lower molecular weight aldehydes and ketones, from 4 to 115 parts by weight of a sulfur compound selected from the group consisting of sulfurous acid and water-soluble salts thereof, and from 0.3 to 64 parts by weight of the complexing metal present in a compound selected from the group consisting of the hydroxides and the water-soluble salts of iron, copper, chromium, nickel, cobalt, manganese, zinc, aluminum, titanium, vanadium, and mixtures thereof; said second agent is selected from the group consisting of ammonium chromate, ammonium dichromate, sodium chromate, sodium dichromate, potassium chromate, potassium dichromate, and mixtures thereof; and the total amount of said first agent and said second agent added is at least 4.3 parts per million by weight of the water being treated.

8. The method for treating water according to claim 6 wherein said second agent is sodium dichromate dihydrate, the weight ratio of said first agent to said second agent being 7:1, and the total amount of said first agent and said second agent added is at least 4.3 parts per million by weight of the water being treated.

9. The method of treating water according to claim 7 wherein said second agent is sodium dichromate dihydrate, the weight ratio of said first agent to said second agent is 7:1, and the total amount of said first agent and said second agent is at least 4.3 parts per million by weight of the water being treated.

10. The method for treating water according to claim 8 wherein the total amount of said first agent and said second agent is in the range of 11.4 to 114 parts per million by weight of the water being treated.

11. The method for treating water according to claim 9 wherein the total amount of said first agent and said second agent is in the range of 11.4 to 114 parts per million by weight of the water being treated.

12. A method for treating polluted, oxygen-depleted water to increase its capability for supporting marine life comprising the addition to said water of an agent selected from the group consisting of (1) a sulfoalkylated tannin and (2) a metal complex of a sulfoalkylated tannin wherein said metal is selected from the group consisting of iron, copper, chromium, nickel, cobalt, manganese, zinc, aluminum, titanium, vanadium and mixtures thereof; and wherein the amount of said additive added is at least 4.3 parts per million by weight of water being treated.

13. The method for treating polluted oxygen-depleted water according to claim 12 wherein said additive agent comprises sulfomethylated quebracho prepared by contacting quebracho extract with, in parts by weight per 100 parts by weight of said quebracho extract, from 15 to 36 parts of formaldehyde and from 35 to 65 parts of sodium bisulfite.

14. The method for treating polluted, oxygen-depleted water according to claim 12 wherein said additive agent comprises metal complexes of a sulfomethylated quebracho; said metal being selected from the group consisting of iron, copper, chromium, nickel, cobalt, manganese, zinc, aluminum, titanium, vanadium and mixtures thereof; said metal complex having been prepared by contacting quebracho extract in an alkaline aqueous reaction medium at a temperature within the range from 70 to 300° F. and in amounts based on 100 parts by weight of quebracho with from 1 to 60 parts by weight of a carbonyl compound selected from the group consisting of the lower molecular weight aldehydes and ketones, from 4 to 115 parts by weight of a sulfur compound selected from the group consisting of sulfurous acid and water-soluble salts thereof, and from 0.3 to 64 parts by weight of a complexing metal present in a compound selected from the group consisting of the hydroxides and the water-soluble salts of iron, copper, chromium, nickel, cobalt, manganese, zinc, aluminum, titanium, vanadium, and mixtures thereof.

15. The method of claim 12 further comprising the addition of a second agent selected from the group consisting of the water-soluble cationic and anionic compounds of chromium, aluminum, vanadium, titanium, zinc, manganese, and mixtures thereof, with the weight ratio of said first agent to said second agent being within the range from 20:1 to 1:1.

16. The method of treating polluted, oxygen-depleted water according to claim 15 wherein the first agent comprises a sulfomethylated quebracho prepared by contacting quebracho extract with, in parts by weight per 100 parts by weight of said quebracho extract, from 15 to 36 parts of formaldehyde and from 35 to 65 parts of sodium bisulfite; said second agent is selected from the group consisting of ammonium chromate, ammonium dichromate, sodium chromate, sodium dichromate, potassium chromate, potassium dichromate, and mixtures thereof; and the total amount of said first agent and said second agent added is at least 4.3 parts per million by weight of water being treated.

17. The method of treating polluted, oxygen-depleted water according to claim 15 wherein said first agent comprises a metal complex of a sulfomethylated quebracho; said metal being selected from the group consisting of iron, copper, chromium, nickel, cobalt, manganese, zinc, aluminum, titanium, vanadium and mixtures thereof; said metal complex having been prepared by contacting sulfomethylated quebracho in an alkaline aqueous reaction medium at a temperature within the range of from 70 to 300° F. and in amounts based on 100 parts by weight of said sulfomethylated quebracho with from 1 to 60 parts by weight of a carbonyl compound selected from the group consisting of the lower molecular weight aldehydes and ketones from 4 to 115 parts by weight of a sulfur compound selected from the group consisting of sulfurous acid and water-soluble salts thereof, and from 0.3 to 64 parts by weight of the complexing metal present in a compound selected from the group consisting of the hydroxides and the water-soluble salts of iron, copper, chromium, nickel, cobalt, manganese, zinc, aluminum, titanium, vanadium, and mixtures thereof; said second agent is selected from the group consisting of ammonium chromate, ammonium dichromate, sodium chromate, sodium dichromate, potassium chromate, potassium dichromate, and mixtures thereof; and the total amount of said first agent and said second agent added is at least 4.3 parts per million by weight of the water being treated.

18. A method for treating water which has been chemically purified and rendered biologically sterile for human consumption to increase its capability to support marine life comprising the addition to said water of an agent selected from the group consisting of
(1) a sulfoalkylated tannin; and
(2) a metal complex of a sulfoalkylated tannin wherein said metal is selected from the group consisting of iron, copper, chromium, nickel, cobalt, manganese, zinc, aluminum, titanium, vanadium and mixtures thereof.

References Cited

UNITED STATES PATENTS

| 799,246 | 9/1905 | Lepetit et al. | 8—94.32 X |
| 2,653,967 | 9/1953 | Monroe | 260—473.5 |

FOREIGN PATENTS 15,648  1906  Great Britain.

MICHAEL E. ROGERS, *Primary Examiner.*

U.S. Cl. X.R.

119—3, 5; 252—181; 260—473.5

UNITED STATES PATENT OFFICE
CERTIFICATE OF CORRECTION

Patent No. 3,446,733                                                        May 27, 1969

Francis J. Shell

It is certified that error appears in the above identified patent and that said Letters Patent are hereby corrected as shown below:

Column 10, line 4, "ammonium" should read -- aluminum --.

Signed and sealed this 24th day of March 1970.

(SEAL)
Attest:

Edward M. Fletcher, Jr.                                    WILLIAM E. SCHUYLER, JR.
Attesting Officer                                                    Commissioner of Patents